(12) United States Patent
Fombell, II

(10) Patent No.: US 8,318,285 B1
(45) Date of Patent: Nov. 27, 2012

(54) ARTICLE FOR ABSORBING FLUIDS

(76) Inventor: F. Robert Fombell, II, Chesapeake, VA (US)

( * ) Notice: Subject to any disclaimer, the term of this patent is extended or adjusted under 35 U.S.C. 154(b) by 193 days.

(21) Appl. No.: 12/924,076

(22) Filed: Sep. 20, 2010

Related U.S. Application Data

(60) Provisional application No. 61/276,957, filed on Sep. 18, 2009.

(51) Int. Cl.
B32B 3/06 (2006.01)
B32B 5/00 (2006.01)
B32B 7/00 (2006.01)

(52) U.S. Cl. ............. 428/99; 112/406; 428/98; 428/223

(58) Field of Classification Search ................... 428/99, 428/98, 223; 112/406
See application file for complete search history.

(56) References Cited

U.S. PATENT DOCUMENTS

| | | |
|---|---|---|
| 3,669,204 A | 6/1972 | Andrews |
| 4,875,537 A | 10/1989 | Garnatz et al. |
| 4,936,418 A | 6/1990 | Clausen |
| 5,404,848 A | 4/1995 | Nelson |
| 5,417,310 A | 5/1995 | Halseth |
| 5,501,290 A | 3/1996 | Voltz et al. |
| 5,526,900 A | 6/1996 | Mason |
| 5,614,280 A | 3/1997 | Hanna |
| 5,967,200 A | 10/1999 | Hall |
| 6,170,586 B1 | 1/2001 | Stroman |
| 2002/0088074 A1 | 7/2002 | Johnston et al. |
| 2004/0031119 A1* | 2/2004 | McKay .......................... 15/227 |
| 2007/0077845 A1* | 4/2007 | Cheskis ........................ 442/389 |

* cited by examiner

Primary Examiner — Brent O'Hern
(74) Attorney, Agent, or Firm — Wooten & Shaddock, PLC

(57) ABSTRACT

An article for absorbing fluids that includes a backing sheet and an absorption sheet, wherein the absorption sheet is made of a material that is capable of absorbing any oil based liquid, and wherein the backing sheet is at least partly affixed to the absorption sheet; at least one first fastener means, wherein the first fastener means includes an attachment means on the bottom side and a mating attachment means on the top side, and wherein the bottom side of the first fastener means is at least partly affixed to a top side of the absorption sheet; and one or more malleable strips positioned along at least a portion of a length of the article.

19 Claims, 13 Drawing Sheets

ARTICLE FOR ABSORBING FLUIDS

CROSS-REFERENCE TO RELATED APPLICATIONS

This patent application claims the benefit of U.S. Provisional Patent Application Ser. No. 61/276,957, filed Sep. 18, 2009, the entire disclosure of which is incorporated herein by reference.

BACKGROUND OF THE INVENTION

1. Field of the Invention

This invention relates generally to the field of articles for absorbing fluids. In particular, the present invention relates to articles for absorbing fluids that can be removably attached to a motor or other device approximately in or under the area of a fluid leak.

2. Description of Related Art

Fluid leaks, such as, for example, oil leaks from cars, light trucks, or industrial equipment, may be difficult and expensive to repair. Over time, virtually all seals leak, but with the exception of excessive seal leaks, this problem is largely ignored.

Currently, there are two basic solutions for arresting fluid leaks. The first and most common solution is parts replacement. Generally, parts, such as seals, are replaced in an effort to stop the leak. However, parts replacement is often prohibitively expense, not always successful, can create other problems if not accurately executed, and typically requires vehicle or equipment down time.

The second and less common solution is the addition of leak stopping liquids to the fluid system. "Leak stoppers" claim to soften fluid seals and thereby stop or dramatically reduce fluid leaks. However, leak stoppers usually change the lubricity and viscosity characteristics of the fluid, their benefit is marginal, and their effect on engine or equipment longevity is questionable.

SUMMARY OF THE INVENTION

The apparatuses and methods of this invention prevent fluid that has escaped from vehicles or equipment from reaching the environment by the attachment of a fluid absorbent article approximately in or under the area of the fluid leak. The fluid absorbent article can be removed when saturated and replaced with another fluid absorbent article.

In certain exemplary, non-limiting embodiments, the apparatuses and methods of this invention provide a fluid absorbent article, or fluid arrestor, includes a water resistant backing sheet, or propagation sheet, having a top side and a bottom side. The backing sheet is at least partly affixed to an absorption sheet, or laminar pad, made of a material that is capable of absorbing any oil based liquid. A fastener means, such as Velcro is affixed to the absorption sheet and/or the backing sheet, so that the fluid arrestor can be removably attached or coupled to a motor or other device approximately in or under the area of a potential fluid leak.

In certain exemplary, non-limiting embodiments, the backing sheet is made of a compostable material. Thus, while the fluid arrestor provides the means necessary to keep large quantities of used motor or other types of oil from reaching the environment, disposal of saturated fluid arrestors can be done in keeping with environmentally sound practices. For example, when a fluid arrestor has reached saturation and is replaced, the oil-saturated absorption sheet can be separated from the backing sheet, pulverized, and combined with other combustible materials for use as a fuel source. The backing sheet can then be sent with other biodegradable materials to a landfill. Over time, the backing sheet will decompose and return to its primary state in the form of soil. Soil created from compostable materials is rich in nutrients and is readily used for crop production. The cycle has been completed and the process can be repeated indefinitely.

In order to prevent delamination of the backing sheet from the absorption sheet, in certain exemplary, non-limiting embodiments, the backing sheet is heat sealed to at least the leading and trailing edges of the absorption sheet. When properly applied, an impulse heat seal, for example, provides an appropriate amount of heat to bond the backing sheet to the absorption sheet without deforming either substrate. Since the leading and trailing edges of the absorption sheet are mated with loop fastener material, the actual bond exists between the back side and the loop fastener material and the backing sheet. Heat sealing the backing sheet to the absorption sheet is superior to the use of a transfer adhesive alone in that the transfer adhesive can result in inconsistent bonds between the edges of the two materials. While a transfer adhesive can be used to provide indexing of the two materials to be heat-sealed, heat-sealing at least the leading and trailing edges of the fluid arrestor backing sheet to the absorption sheet increases the performance, integrity, and quality of the fluid arrestor.

Because secure attachment to a device, such as the underside of an automobile drive train in the rear main seal area, is of critical importance, malleable metal alloy strips are integrated into the fluid arrestor. When installing the fluid arrestor, the fluid arrestor can be at least partially molded to the contours of the structural components in the mounting vicinity.

Using the fluid arrestor as a tool to measure the amount of oil kept from reaching the environment further strengthens its role as a front-runner in the "Green Movement" to keep waste oil out of our rivers, lakes, and streams. Never before has there been a viable means that provides such critically important data. The consumer must be made aware of the devastating effects of used motor oil reaching the environment. The fluid arrestor can provide the means necessary to focus consumer attention on this environmentally destructive problem.

Accordingly, this invention provides a fluid arrestor that is useable for arresting fluids emanating from engines associated with lawn tractors, farm equipment, motorcycles, large and small recreational vehicles, transmissions, differentials, power steering units, and the like.

This invention separately provides a fluid arrestor that can provide a visual indicator of absorption sheet saturation.

This invention separately provides a fluid arrestor that can incorporate a backing sheet that changes color as it is exposed to an oil, thereby indicating that absorption capacity is approached and that it is time for replacement.

This invention separately provides a fluid arrestor that can incorporate an information block for recording date of installation and vehicle odometer reading.

This invention separately provides a fluid arrestor that can assist in measuring the amount of oil leaking from engine over specific period of time.

This invention separately provides a fluid arrestor that can incorporate thickness variations for accommodation of leak rate.

This invention separately provides a fluid arrestor that can incorporate a date stamp in the backing sheet indicating date of manufacture.

These and other features and advantages of this invention are described in or are apparent from the following detailed description of the exemplary, nonlimiting embodiments.

BRIEF DESCRIPTION OF THE DRAWINGS

The exemplary embodiments of this invention will be described in detail, with reference to the following figures, wherein like reference numerals refer to like parts throughout the several views, and wherein.

DETAILED DESCRIPTION OF EXEMPLARY EMBODIMENTS

For simplicity and clarification, the operating principles, design factors, and layout of the apparatuses and methods of the fluid arrestor, according to this invention, are explained with reference to various exemplary embodiments of the apparatuses and methods of the fluid arrestor. The basic explanation of the operation of the apparatuses and methods of the fluid arrestor is applicable for the understanding and design of the constituent components and steps employed in the use of the fluid arrestor, according to this invention.

Furthermore, for the sake of simplicity, the fluid arrestor will be described with reference to the fluid arrestor's application to certain components of a vehicle's engine and absorption of a lubricating motor oil. However, it should be understood that this is merely for the sake of simplicity and illustration of one possible application of the fluid arrestor. Therefore, this exemplary application is not to be construed as limiting this invention, but should be understood to represent one possible application of the fluid arrestor in one exemplary field of use.

It should be appreciated that the apparatuses and methods of this invention may be utilized to absorb, for example, any oil or oil based liquid, such as, any petroleum, synthetic, vegetable, or mineral based oil including, but not limited to lubricating oils, synthetic lubricating oils, transmission fluids, power steering fluids, hydraulic fluids, kerosene, diesel fuel, after market motor oil additives, and the like.

Likewise, the apparatuses and methods of this invention may be utilized in a variety of applications, such as, for example, on motors, engines, hydraulic systems, food preparation systems, refinery systems, recycling and reclaiming systems, and other applications where similar fluids may leak. Furthermore, the application of this invention is not limited to a flat area, but may also be applied to or across, for example, an irregularly shaped area, a cylindrical shaped area, or a spherical shaped area.

Figure 1:
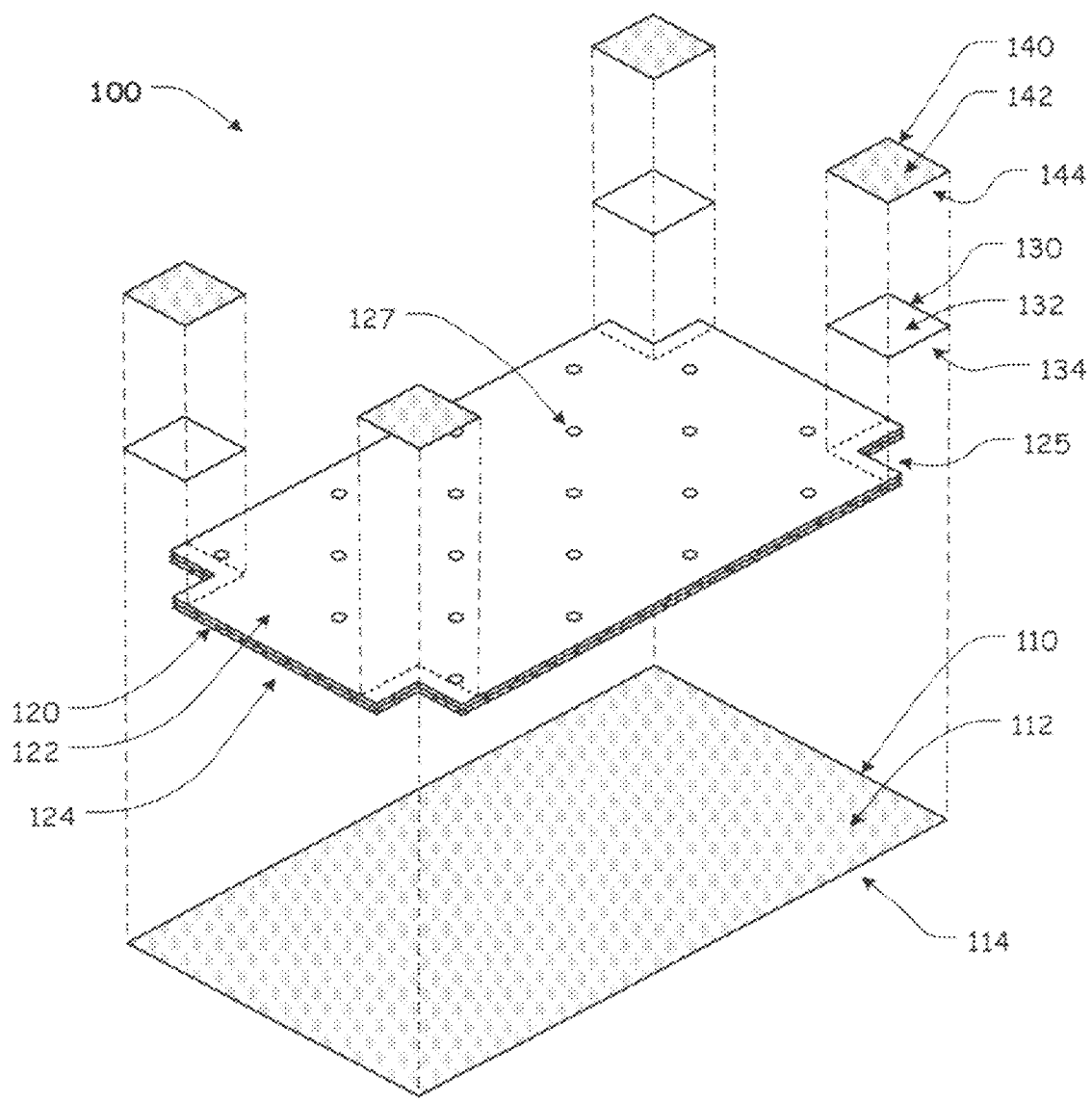
FIG. 1 shows a perspective view of the constituent components of a first exemplary embodiment of a fluid arrestor, according to this invention.

FIG. 1 shows a perspective view of the constituent components of a first exemplary embodiment of a fluid arrestor 100, according to this invention. As shown in FIG. 1, the fluid arrestor 100 includes at least some of a backing sheet 110, an absorption sheet 120, a first fastener means 130, and a second fastener means 140. Although the fluid arrestor 100 is shown having a generally rectangular shape, it should be appreciated that the overall shape of the fluid arrestor 100, and each of the constituent components of the fluid arrestor 100, is not limited to any particular shape, but may take any regular or irregular shape, such that the fluid arrestor 100 may be designed to fit a particular application. It should be understood that the fluid arrestor 100, and any of the constituent components of the fluid arrestor 100, may take a specific shape and size depending on the desired application and the conditions that are expected to occur during use of the fluid arrestor 100. The overall size, shape, and placement of the fluid arrestor 100 will be a design choice, within the spirit and scope of this invention, which must be made for each specific application.

The backing sheet 110 includes a top side 112 and a bottom side 114, and may be made of a variety of water and/or oil resistant, non-porous or semi-porous material including, but not limited to, plastic, polyester, metal foil, acrylic, Mylar, or Kevlar. In various exemplary embodiments, the backing sheet 110 comprises a compostable, or biodegradable, material.

In various exemplary embodiments, the overall size and shape of the backing sheet 110 are substantially similar to the overall size and shape of the absorption sheet 120. However, in various exemplary embodiments wherein the overall shape of the backing sheet 110 is different from the overall shape of the absorption sheet 120, the shape of the backing sheet 110 is such that the shape of the top side 112 of the backing sheet 110 is capable of substantially, and in various exemplary embodiments totally, encompassing the shape of the bottom side 124 of the absorption sheet 120. Likewise, in various exemplary embodiments wherein the overall size of the backing sheet 110 is different from the overall size of the absorption sheet 120, the size of the backing sheet 110 is such that the top side 112 of the backing sheet 110 is capable of substantially, and in various exemplary embodiments totally, encompassing the bottom side 124 of the absorption sheet 120. In short, in various exemplary embodiments, the footprint of the backing sheet 110 is equal to or larger than the footprint of the absorption sheet 120.

It should be understood that different materials may be selected to form the backing sheet 110 and that one of ordinary skill in the art, using the teaching of this invention, could readily determine the type of material and construction that would be required for the backing sheet 110. Thus, selection of a specific material for the backing sheet 110 is a design choice within the spirit and scope of this invention.

Several potential alternative oil resistant backing sheet materials that may be used in the assembly of the fluid arrestor 100 are identified in TABLE I along with the manufacturer of each potential oil resistant backing sheet material. It should be appreciated that TABLE I is not an exhaustive list of potential alternative oil resistant backing sheet materials, and that other backing sheet materials, not listed in TABLE I, may also be used.

TABLE 1

| Manufacturer | Potential Backing Sheet Material |
|---|---|
| DuPont | Kaladex ® 1030 |
| | Kaladex ® 1031 |
| | Kaladex ® 2000 |
| | Kaladex ® 2030 |
| | Melinex ® 339 |
| | Melinex ® 329 |
| | Melinex ® 301 |
| | Melinex ® 850 |
| | Melinex ® 800 |
| | Melinex ® 723 |
| | Melinex ® 506 |
| | Melinex ® 453 |
| | Melinex ® 401 |
| | Melinex ® 34 |
| | Mylar ® 250 SLB 300 |
| | Mylar ® 350 SLB 300 |
| | Mylar ® RB52 |
| | Mylar ® RL33 |
| | Mylar ® RL32 |
| | Mylar ® RL53 |
| | Mylar ® OB12 |
| | Mylar ® 43 |
| | Mylar ® RL42 |
| | Mylar ® RL31 |
| | Mylar ® OB02 |
| | Mylar ® OB01 |
| | Mylar ® OL13 |
| | Mylar ® OL12 |
| | Mylar ® OL2 |
| | Mylar ® OL |
| | Mylar ® RB5 |
| | Mylar ® RL4 |
| | Mylar ® 100CL |
| | Mylar ® 50CL |
| | Mylar ® P25 |
| | Mylar ® LB |
| Dupont | Sorona ™ Polymer (Propanediol PDO) |
| | Teijin ® Tetron ® PET Polyester Film |
| | Teonex ® PEN Polyester Film |
| Edmund Scientific | Mylar ® Film Sheeting CR30536-04 |
| The Sustainable Village | Thin Film Sheeting PV9100 |
| 3M | RE35NEARL Scotchtint ™ Sun Control Window Film |
| | RE20NEARL Scotchtint ™ Sun Control Window Film |
| | LE50AMARL Scotchtint ™ Plus All Season Window Film |
| | SCLARL400 Scotchield ™ Ultra Safety and Security Film |
| | S35NEARL Scotchshield ™ Ultra Safety and Security Film |
| | HP PNTHR35 Scotchtint ™ High Performance Panther Black Film |
| | HP PNTHR20 Dark Scotchtint ™ High Performance Panther Black Film |
| | Scotchal ™ Film Series 210 Dusted and Frosted Crystal |
| | Scotchal ™ Electrocut ™ film Series 7725 |
| | Controltac ™ 160 Plus |
| | Controltac ™ 180 Plus |
| | Controltac ™ 181 Plus |
| | Controltac ™ 190 Plus |
| Gerber Film | 210 |
| | 230 |
| | 3555 |

The absorption sheet 120 includes a top side 122 and a bottom side 124. In various exemplary embodiments, the absorption sheet 120 also includes at least one notched portion 125. Each notched portion 125 is provided to allow at least a portion of a bottom side 134 of the first fastener means 130 to remain exposed after the first fastener means 130 is attached to the absorption sheet 120. In various exemplary embodiments, the notched portion 125 may be provided along each edge of the absorption sheet 120 by allowing the footprint of the absorption sheet 120 to be smaller than the footprint of the backing sheet 110 (i.e., a length of each edge of the absorption sheet 120 is smaller than a length of each of the corresponding edges of the backing sheet 110).

As shown in FIG. 1, a plurality of notched portions 125, are included in the absorption sheet 120, and each notched portion 125 is located in a corner of the absorption sheet 120.

It should be appreciated that the number, shape, and placement of any included notched portions 125 of the absorption sheet 120 are a design choice within the spirit and scope of this invention, which will vary depending on the specific application for which the fluid arrestor 100 is to be used.

The absorption sheet 120 may be made of a variety of materials that are capable of absorbing or wicking various oils while repelling water. Thus, the fluid arrestor 100 will, upon contact, absorb or wick various oils, even in the presence of water.

The absorption sheet 120 may be comprised of a single layer of material. Alternatively, the absorption sheet 120 may be comprised of multiple layers of one or more similar or differing materials. When the absorption sheet 120 includes multiple layers of material, the layers may be at least partially attached or affixed to one another via, for example, heat sealing, heat die stamping, stapling, buttoning, adhesively affixing, riveting, snapping, sewing, pressure sealing, clamping, ultrasonically bonding, grommeting, and the like, at various affixing points 127.

In various exemplary embodiments, the absorption sheet 120 is comprised of a melt blown polypropylene absorption sheet. However, it should be understood that different materials may be selected to form the absorption sheet 120 and that one of ordinary skill in the art, using the teaching of this invention, could readily determine the type of sorbent that would be required to form the absorption sheet 120. Thus, selection of the specific sorbent for the absorption sheet 120 is a design choice within the spirit and scope of this invention.

Several potential alternative sorbents that may be used to form the absorption sheet 120 are identified in TABLE II along with the manufacturer of each potential sorbent. It should be appreciated that TABLE II is not an exhaustive list of potential alternative sorbents, and that other sorbents, not listed in TABLE II, may also be used to form the absorption sheet 120.

TABLE II

| Manufacturer | Potential Alternative Sorbents |
|---|---|
| Great Lakes Safety | M100 Oil Only |
| | M200 Oil Only |
| | E1850 Oil Only |
| | E300 Oil Only |
| Spill Tech Industries | WPF100H Oil Only |
| | WPKF50H Oil only |
| | WPF200S Oil Only |
| | WRF144H Oil Only |
| | WRF288S Oil Only |
| | WRSF144H Oil Only |
| | WRSF288S Oil Only |
| National Sorbents, Inc. | MAXX Select Oil Only Sorbent |
| SPILL 911 Skim Response | SR-3030-0100 Oil Only |
| | SR-3036-0200 Oil Only |
| | SR-3033-0100 Oil Only |
| | SR-3038-0050 Oil Only |
| | SR-3040-0002 Oil Only |
| | SR-3041-0001 Oil Only |
| | SR-3042-0002 Oil Only |
| | SR-3043-0001 Oil Only |
| 3-M | M-PD1520DD Oil Only |
| | M-PD720GG Oil Only |
| | M-RL15150DD Oil Only |
| | M-RL33150DD Oil Only |
| | M-RL38150DD Oil Only |
| | M-RG36300E Water Resistant |
| | M-RGC36100E Water Resistant |
| | HP-156 Oil Only |
| | HP-157 Oil Only |
| | HP-255 Water Resistant |
| | HP-256 Water Resistant |
| | HP-100 Oil Only |
| | T-151 Oil Only |
| | T-156 Oil Only |
| | T-157 Oil Only |
| | T-100 Oil Only |
| | T-190 Oil Only |
| 3M | HP-556 Oil Only |
| | HP-557 Oil Only |
| | HP-500 Oil Only |
| | P-SKFL5 Oil Only |
| | P-FL550D Oil Only |
| | HP-156 Oil Only |
| | HP-157 Oil Only |
| | HP-255 Oil Only |
| | HP-256 Oil Only |
| | C-RL15150DD Water Resistant |
| | C-PD914DD Water Resistant |
| | C-RL38150DD Water Resistant |
| | P-110 Water Resistant |
| | P-130 Water Resistant |
| | P-190 Water Resistant |
| | P-380 Water Resistant |

The first fastener means 130 and a second fastener means 140 each include a top side 132 and 142, respectively, and a bottom side 134 and 144, respectively. The first fastener means 130 and the second fastener means 140 typically include an attachment means on one side, such as an adhesive, and a mating attachment means on the other side, such as either the hook portion or the loop portion of a Velcro type hook and loop fastener. More specifically, the first fastener means 130 includes an attachment means on the bottom side 134, and a mating attachment means on the top side 132, while the second fastener means 140 includes an attachment means on the top side 142, and a mating attachment means on the bottom side 144.

In this manner, the first fastener means 130 and the second fastener means 140 may be temporarily attached to each other, via their respective mating attachment means, and each may also be attached, either temporarily or permanently, to another surface via their attachment means.

The first fastener means 130 and the second fastener means 140 may be selected from a variety of acceptable mating attachment means, and it should be understood that different mating attachment means may be selected as the first fastener means 130 and the second fastener means 140. In various exemplary embodiments, the mating attachment means may be a releasable mating attachment means, such as, for example, hook and loop fasteners, male/female snap-release buckles, buttons, snaps, or other mating attachment means. Several potential alternative mating attachment means that may be used as the first fastener means 130 and the second fastener means 140 are identified in TABLE III along with the manufacturer of each potential mating attachment means. It should be appreciated that TABLE III is not an exhaustive list of potential alternative mating attachment means, and that other mating attachment means, not listed in TABLE III, may also be used as the first fastener means 130 and the second fastener means 140.

TABLE III

| Manufacturer | Mating Attachment Means |
|---|---|
| Aplix Fasteners, Inc | #800 Hook & Loop |
| | #400 Hook & Loop |
| | #200 Mushroom & Loop |
| | #810 Hook & Loop |
| | #820 Hook & Loop |
| | #821 Hook & Loop |
| | #808 Hook & Loop Metalized |
| | #905 Mold-In Hook |
| | #915 Mold-in Hook |
| | #224 Die Cut Mold-in Fastener. #912 Glue Down Hook |
| | #624 Loop |
| 3M | SJ-3401, SJ-3402 Plain back Scotchmate hook and loop |
| | SJ-3418, SJ-34 19 Flame resistant plain back Scotchmate Hook and loop |
| | SJ-3476, SJ-3477 Polyester plain back Scotchmate Polyester hook and loop |
| | SJ-3486, SJ-3487 Flame resistant plain back Polyester hook and loop |
| | SJ-3440 Type 250, black Dual Lock Fastener |
| | SJ-3441 Type 400, black Dual Lock Fastener |
| | SJ-3442 Type 170, black Dual Lock Fastener |
| | SJ-3443 Type 400, black, reinforced fabric backed Dual Lock Fastener |
| | SJ-3444 Type 170, black, reinforced fabric backed Dual Lock Fastener |
| | SJ-3460 Type 250, clear Dual Lock Fastener |
| | SJ-3481 Type 400, rigid strips, black Dual Lock Fastener |
| | SJ-3540 Type 250, black with black foam adhesive Dual Lock Fastener |
| | SJ-3541 Type 400, black with black foam adhesive Dual Lock Fastener |
| | SJ-3542 Type 170, black with black foam adhesive Dual Lock Fastener |
| | SJ-3540GT Type 400 black with gray foam adhesive Dual Lock Fastener |
| | SJ-3541GT Type 400 black with gray foam adhesive Dual Lock Fastener |
| | SJ-3542GT Type 170, black with gray foam adhesive Dual Lock Fastener |
| DRS Accessories | Form # FOAMCLIP |

It should be understood that varying types of adhesives may be used as the attachment means on different portions of the bottom side 134 of the first fastener means 130 and/or different portions of the top side 142 of the second fastener means 140.

The adhesives used as the attachment means on the bottom side 134 and the top side 142 may be selected from a variety of acceptable adhesives, such as, for example, a high tack, water proof, and/or solvent resistant adhesive, or a Very High Bond ("VHB") adhesive. When applied to properly prepared surfaces, VHB adhesives withstand shear and torsional stresses several orders of magnitude greater than other types of adhesives. Several potential alternative adhesives are identified in TABLE IV along with the manufacturer of each potential adhesive. It should be appreciated that TABLE IV is not an exhaustive list of potential alternative adhesives, and that other adhesives, not listed in TABLE IV, may also be used.

Depending on the desired application and the conditions that are expected to occur during use of the fluid arrestor 100, the particular adhesive that is used as the attachment means is a design choice within the spirit and scope of this invention.

TABLE IV

| Manufacturer | Potential Alternative Adhesives | |
|---|---|---|
| Spartan Adhesives & Coatings | Synthetic Based | SA-96136 |
| | SBR Based | SA-96152 |
| | Nitrile Based | SA-96170 |
| | Vinyl Based | SA-96211 |
| | SBR Based | SA-96308 |
| | Nitrile Based | SA-96331 |
| | Synthetic Based | SA-96337 |
| International Paper Company | Polyamide Adhesive Resin | |
| | MV Series Intermediate Viscosity Ethyl Cyanoacrylate | |
| Adchem Adhesives Inc. | | |
| | LV Series Low Viscosity Ethyl Cyanoacrylate | |
| | Methacrylate Plastic Adhesive Adbond MA 5400 | |
| | Methacrylate Plastic Adhesive Adbond MA 5420 | |
| | Methacrylate Plastic Adhesive Adbond MA 5450 | |
| Avery Dennison | Low Surface Energy Adhesive Tape MS 1152 | |
| | Low Surface Energy Adhesive Tape MS 1155 | |
| Shell Chemicals | Kraton D-KX222C Polymer Pressure Sensitive Adhesive | |
| Ellsworth Adhesive Systems | Loctite Depend Qzone-Safe No-Mix Hi-Speed Adhesive | |
| Devcon | 5-Minute Epoxy | |
| | Epoxy Plus 25 | |
| | HP 250 | |
| | Plastic Welder | |
| | Plastic Welder II | |
| | Flex Welder | |
| | Composite Welder FS | |
| | Metal Welder | |
| Eastman Chemical Company | Epolene C Polymer | |
| Cotronics Corporation | Duralco 4461 Low Viscosity Adhesive | |
| 3M | 9453LE Adhesive Transfer Tape | |
| | 9471LE Adhesive Transfer Tape | |
| | 9472LE Adhesive Transfer Tape | |
| | 300LSE Hi Strength Transfer Adhesive | |
| | 4956 VHB Tape | |
| | 4941 VHB Tape | |
| | F9473PC Adhesive Transfer Tape | |
| Dielectric Polymers, Inc. | NT-200AP High Temp. Acrylic Transfer Film | |
| | NT-240AP High Temp. Acrylic Transfer Film | |
| | NT-1001 TRAN-SL Silicone Transfer Adhesive | |

Figure 2:
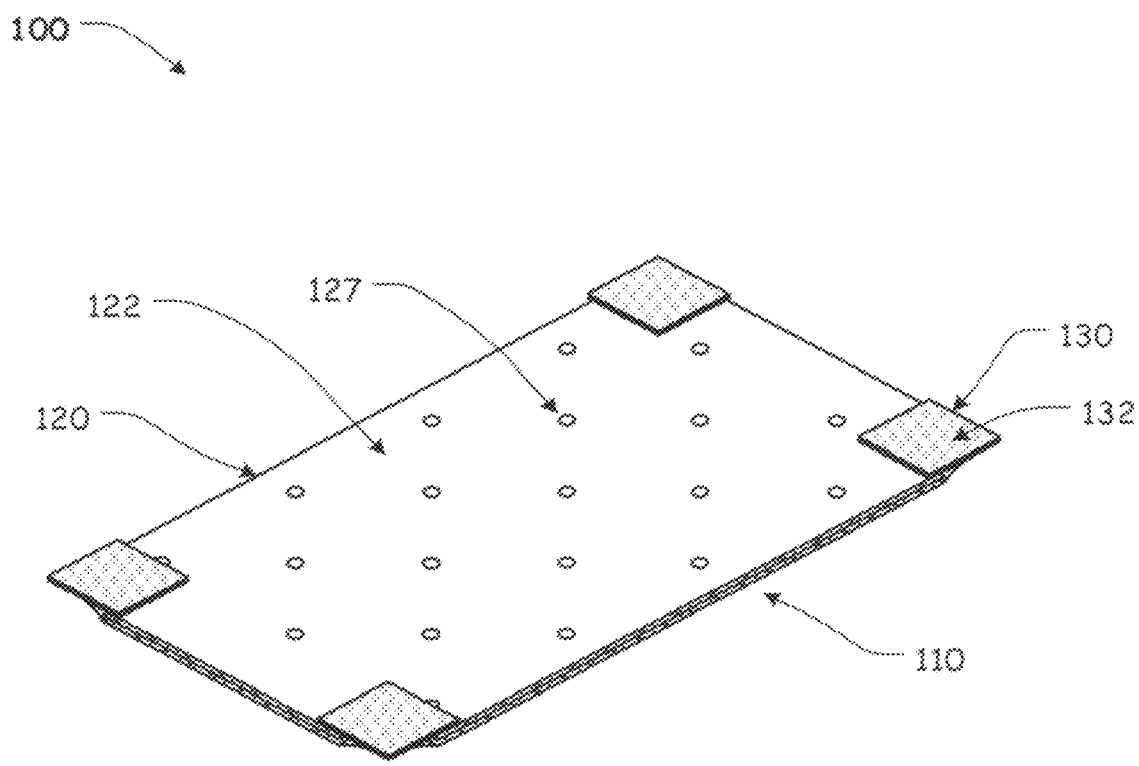
FIG. 2 shows a perspective view of the first exemplary embodiment of the fluid arrestor, according to this invention.

FIG. 2 shows a perspective view of the first exemplary embodiment of the fluid arrestor 100, according to this invention. The assembled fluid arrestor 100, as shown in FIG. 2, is produced by affixing the top side 112 of the backing sheet 110 to the bottom side 124 of the absorption sheet 120 to produce a backed melt blown polypropylene laminar sheet. The first fastener means 130 is at least partly affixed to the top side 122 of the absorption sheet 120, and optionally to both the top side 122 of the absorption sheet 120 and the top side 112 of the backing sheet 110.

This method of assembly reduces the likelihood of delamination of the various components of the fluid arrestor 100 during the life of the apparatus and system. Additionally, the flexible structural support of the backing sheet 110 promotes propagation of any adsorbed or wicked fluid throughout the absorption sheet 120.

In various exemplary embodiments, the backing sheet 110 is at least partly affixed to the absorption sheet 120 via an appropriately selected adhesive. The affixing of the backing sheet 110 to the absorption sheet 120 facilitates oil wicking throughout the absorption sheet 120.

Alternatively, the backing sheet 110 may be affixed to the absorption sheet 120 via another attachment means, such as, for example, one or more folded edges, staples, buttons, adhesive affixing points, rivets, snaps, sewn areas, pressure seals, clamps, ultrasonic bonds, grommets, and the like.

In still other embodiments, the backing sheet 110 may be affixed to the absorption sheet 120, either solely or in conjunction with other affixing means, via the attachment means on the bottom side 134 of the first fastener means 130.

In various exemplary embodiments, wherein the notched portion 125 is not included, the bottom side 134 of the first fastener means 130 is at least partly affixed to the top side 122 of the absorption sheet 120 via the attachment means on the bottom side 134 of the first fastener means 130.

Similarly, if the first fastener means 130 is at least partly affixed to both the top side 122 of the absorption sheet 120 and the top side 112 of the backing sheet 110, the first fastener means 130 is at least partly affixed to the top side 122 of the absorption sheet 120 in an area that includes a notched portion 125. In this manner, the attachment means on the bottom side 134 of the first fastener means 130 is able to contact and affix to both the top side 112 of the backing sheet 110 where the area of the top side 112 that is left exposed when the backing sheet 110 is at least partly affixed to the absorption sheet 120, and a boarder area formed around the notched portion 125 on the top side 122 of the absorption sheet 120.

Figure 3:
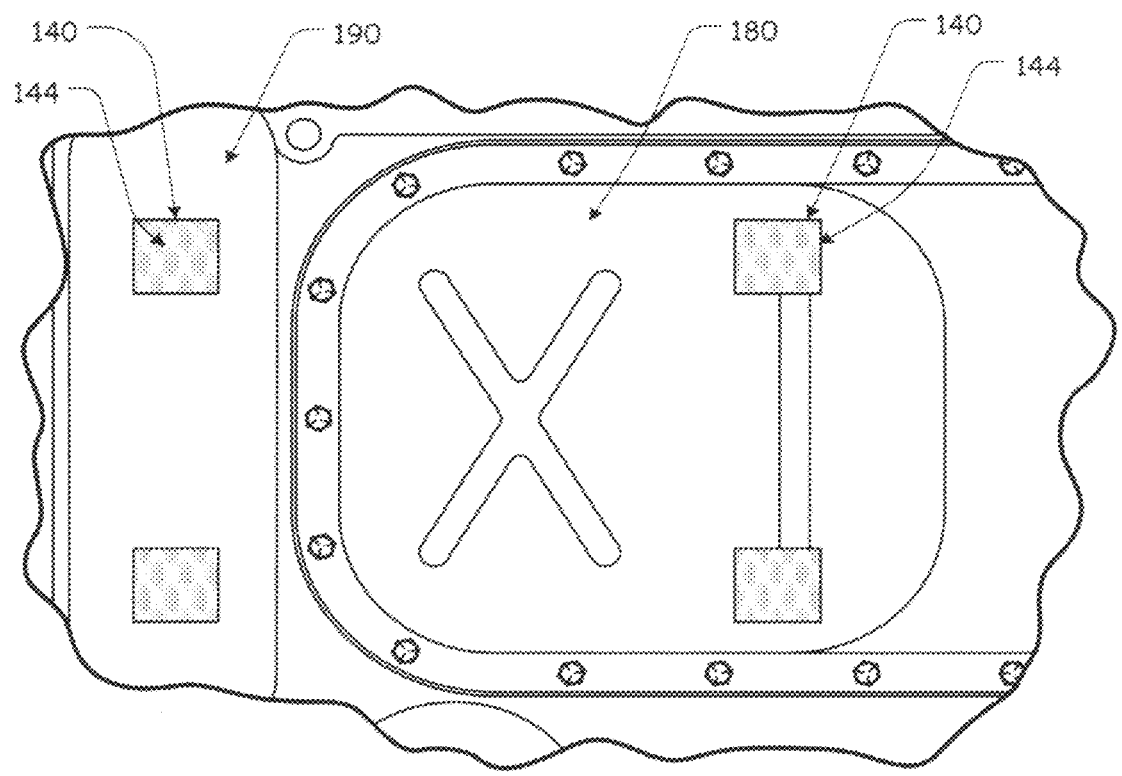
FIG. 3 is a photograph showing a bottom view of a typical engine and transmission assembly with one exemplary embodiment of a plurality of second fastener means affixed to the engine oil pan and the bell housing, according to this invention.

FIG. 3 is a photograph showing a bottom view of a typical engine and transmission assembly with one exemplary embodiment of a plurality of second fastener means 140 affixed to the engine oil pan 180 and the bell housing 190, according to this invention. As shown in FIG. 3, each of the second fastener means 140 is at least partly affixed to the engine oil pan 180 and the bell housing 190, via the attachment means on the top side 142 of the second fastener means 140. In this manner, the mating attachment means on the bottom side 144 of the second fastener means 140 is positioned to accept the mating attachment means on the top side 132 of the first fastener means 130.

It should also be appreciated that the plurality of second fastener means 140 should be affixed to the engine oil pan 180 and the bell housing 190 in the vicinity of a fluid leak, a fluid leak zone, or a fluid drip point, such that the fluid arrestor 100 is optimally positioned to absorb or wick any leaking fluid.

It should also be appreciated that the surface of the engine oil pan 180 and the bell housing 190, at least in the areas where the plurality of second fastener means 140 are to be affixed, may be prepared prior to affixing the plurality of second fastener means 140. Surface preparation may be necessary or desirable to achieve a successful bond of the attachment means on the top side 142 of the second fastener means 140 to the surface, and may be accomplished with alcohol or other cleaners or degreasers, and the optional application of a primer such as, for example, 3M 94 Primer, to the surface.

Figure 4:
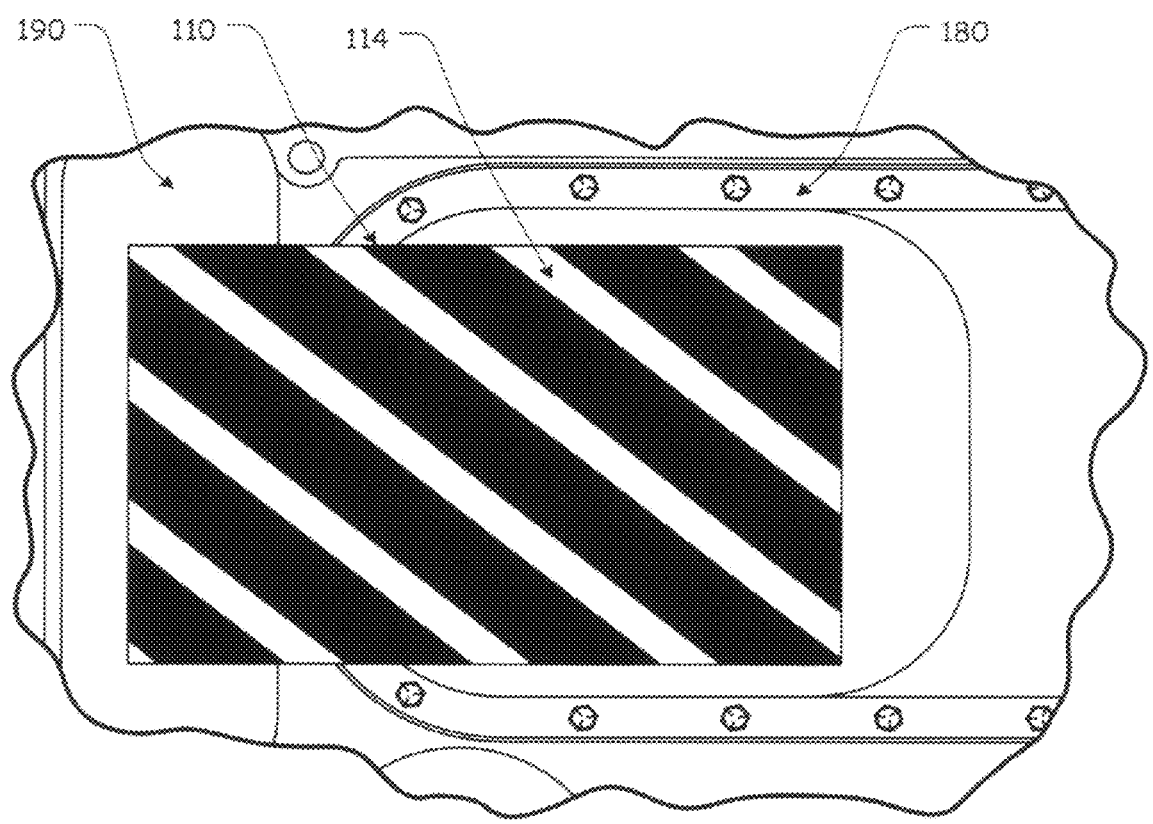
FIG. 4 is a photograph showing the engine and transmission assembly of FIG. 3, wherein one exemplary embodiment of the fluid arrestor is attached to the engine oil pan and the bell housing, according to this invention.

FIG. 4 is a photograph showing the engine and transmission assembly of FIG. 3, wherein one exemplary embodiment of the fluid arrestor 100 is attached to the engine oil pan 180 and the bell housing 190, according to this invention. As shown in FIG. 4, each of the second fastener means 140 is attached, via the mating attachment means, to a corresponding first fastener means 130.

It should be appreciated that the attachment of the mating attachment means on the top side 132, of the first fastener means 130, to the mating attachment means on the bottom side 144 of the second fastener means 140 allows the fluid arrestor 100 to be attached, either temporarily or permanently, to the engine oil pan 180 and the bell housing 190.

In the various exemplary embodiments wherein the fluid arrestor 100 is temporarily attached to the engine oil pan 180 and the bell housing 190, the mating attachment means on the top side 132, of the first fastener means 130, are separated from the mating attachment means on the bottom side 144 of the second fastener means 140. In this manner, the second fastener means 140 may remain affixed to the engine oil pan 180 and the bell housing 190, such that a new fluid arrestor 100 may be attached to the same mating attachment means on the bottom side 144 of the second fastener means 140.

The fluid arrestor 100 may be replaced periodically, for example, at each oil change interval.

Figure 5:
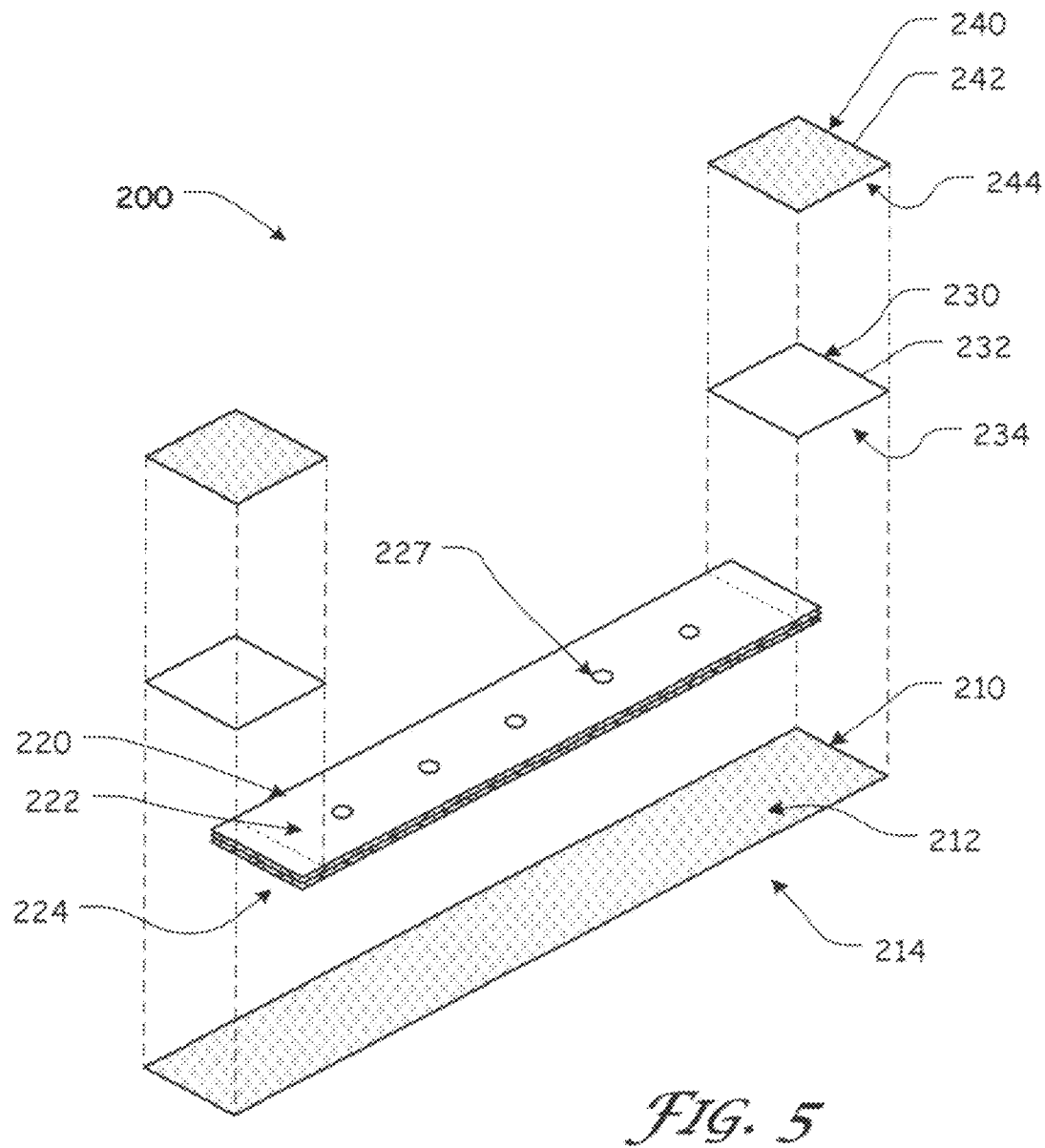
FIG. 5 shows a perspective view of the constituent components of a second exemplary embodiment of a fluid arrestor, according to this invention.

FIG. 5 shows a perspective view of the constituent components of a second exemplary embodiment of a fluid arrestor 200, according to this invention. As shown in FIG. 5, the fluid arrestor 200 includes at least some of a backing sheet 210, having a top side 212 and a bottom side 214, an absorption sheet 220, having a top side 222 and a bottom side 224, a first fastener means 230, having a top side 232 and a bottom side 234, and a second fastener means 240, having a top side 242, and a bottom side 244.

The elements listed above as being included in the fluid arrestor 200 correspond to and operate similarly to the same elements discussed above with respect to FIG. 1.

However, as shown in FIG. 5, the fluid arrestor 200 is of a different overall size and shape than the fluid arrestor 100 discussed above with respect to FIG. 1. Thus, as shown in FIG. 5, the fluid arrestor 200 requires fewer first fastener means 230 than the fluid arrestor 100, and may be used in a smaller or more confined space than the fluid arrestor 100.

As further shown in FIG. 5, a length of the backing sheet 210, along the longest length of the backing sheet 210, is greater than a length of the absorption sheet 220, along the longest length of the absorption sheet 220. In this manner, the attachment means on the bottom side 234 of the first fastener means 230 are able to contact and affix to a portion of the top side 212 of the backing sheet 210 and a portion of the top side 222 of the absorption sheet 220.

It should be appreciated that, in various exemplary embodiments, the absorption sheet 220 may include at least one notched portion 225 (not shown) that functions similarly to the notched portion 125 described above, with respect to FIGS. 1 and 2.

Figure 6:
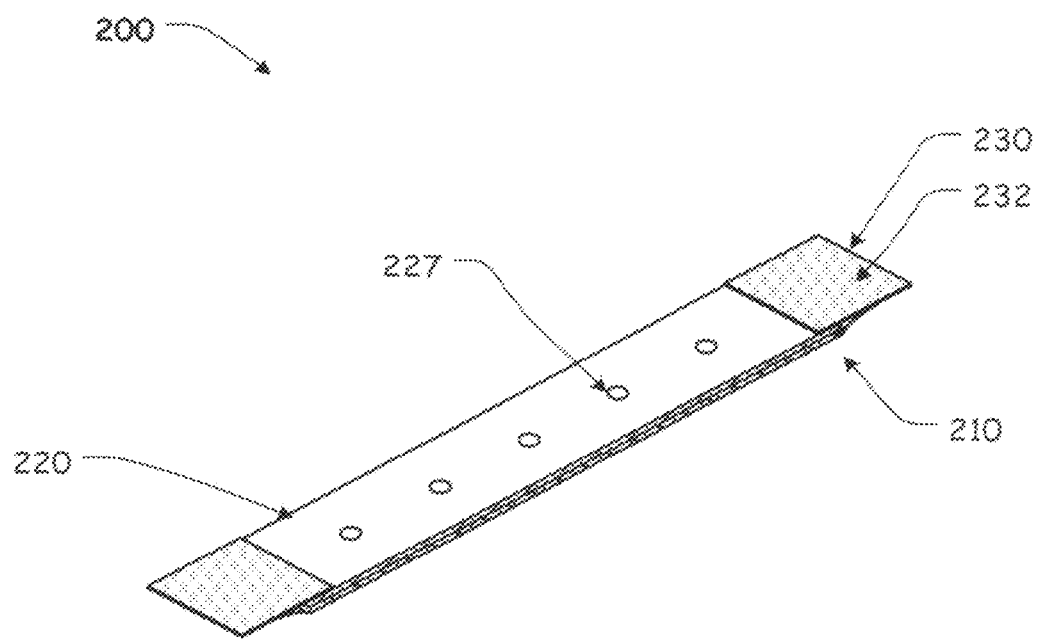
FIG. 6 shows a perspective view of the second exemplary embodiment of the fluid arrestor, according to this invention.

FIG. 6 shows a perspective view of the second exemplary embodiment of the fluid arrestor 200, according to this invention. As shown in FIG. 6, the assembled fluid arrestor 200 is produced in substantially the same manner as the fluid arrestor 100 discussed above with respect to FIG. 2.

Figure 7:
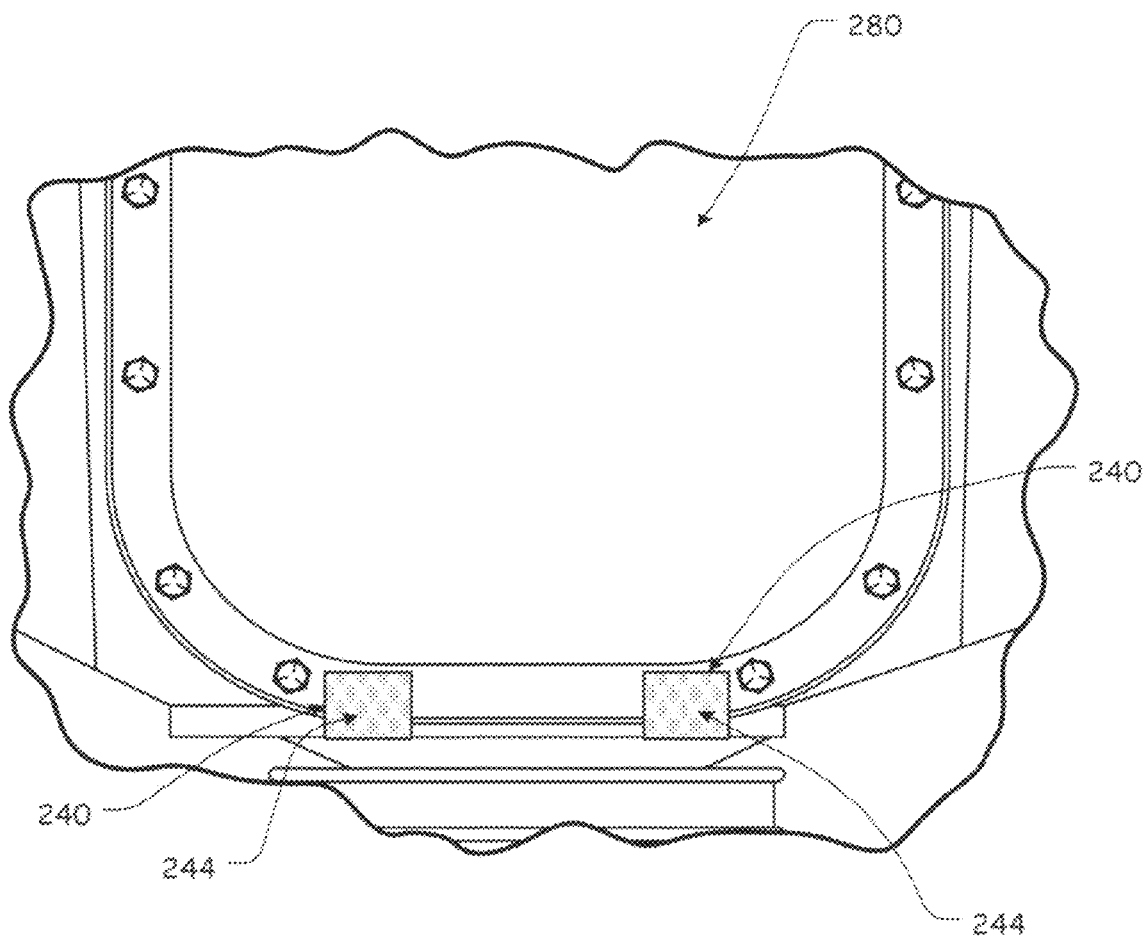
FIG. 7 is a photograph showing a bottom view of a typical engine showing the area around the front main bearing seal with one exemplary embodiment of a plurality of second fastener means affixed to the engine oil pan near the front main bearing seal, according to this invention.

FIG. 7 is a photograph showing a bottom view of a typical engine showing the area around the front main bearing seal with one exemplary embodiment of a plurality of second fastener means 240 affixed to the engine oil pan 280 near the front main bearing seal, according to this invention. It should be appreciated that each of the second fastener means 240 are affixed to the engine oil pan 280 in substantially the same manner as each of the second fastener means 140 is at least partly affixed to the engine oil pan 180 and the bell housing 190, as described above with respect to FIG. 3.

Figure 8:
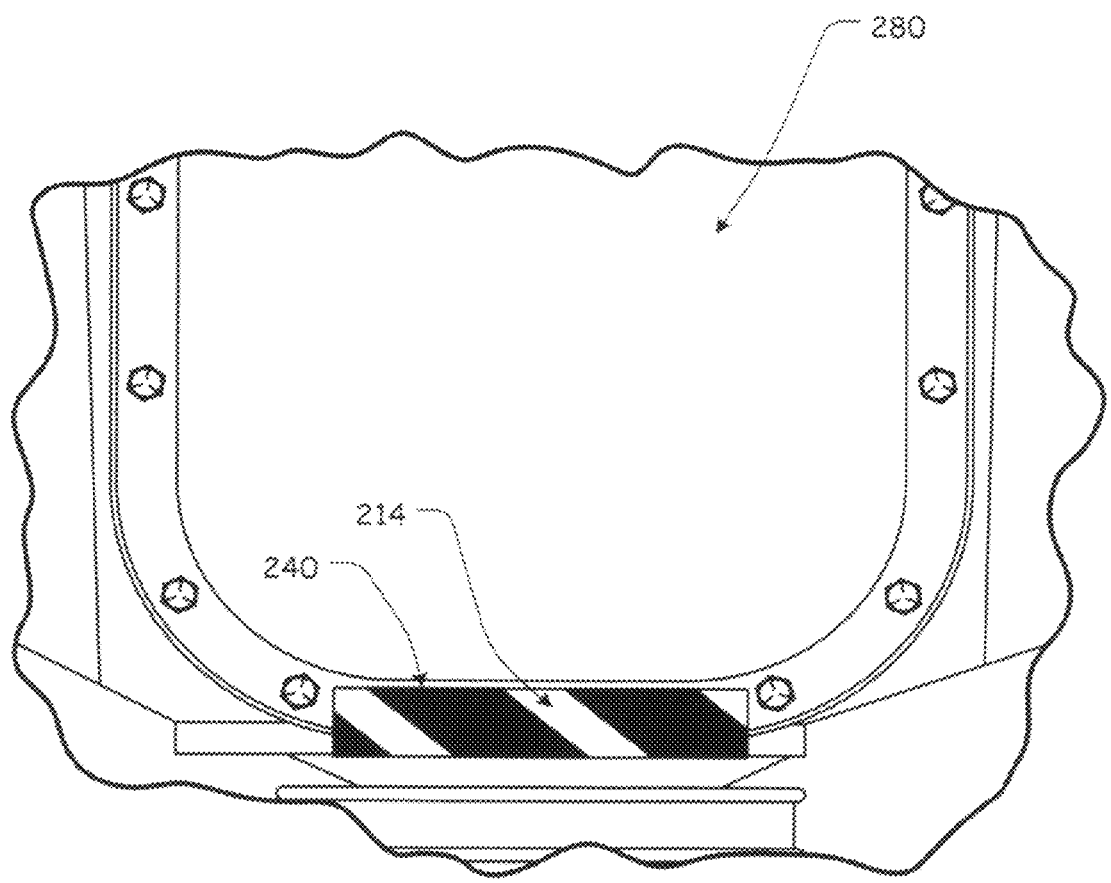
FIG. 8 is a photograph showing the area around the front main bearing seal of FIG. 7, wherein the second exemplary embodiment of the fluid arrestor is attached to the engine oil pan near the front main bearing seal, according to this invention.

FIG. 8 is a photograph showing the area around the front main bearing seal of FIG. 7, wherein a variation of the second exemplary embodiment of the fluid arrestor 200 is attached to the engine oil pan 280 near the front main bearing seal, according to this invention. It should be appreciated that the fluid arrestor 200 is attached to the engine oil pan 280 in substantially the same manner as the fluid arrestor 100 is attached to the engine oil pan 180 and the bell housing 190, as described above with respect to FIG. 4.

The variation of the fluid arrestor 200, as illustrated in FIG. 8, shows sewn areas that are used to affix the backing sheet 210 to the absorption sheet 220.

It should be appreciated that the various materials selected for use in certain various exemplary embodiments of the fluid arrestor may be selected such that the fluid arrestor may be used under a broad range of temperatures and conditions.

It should also be appreciated that although the apparatuses and methods of the fluid arrestor have been specifically described as being used on particular automotive components, the size, shape, materials, and number and placement of fastener means may be customized for use on other automotive components, such as, for example, the transmission pan, the differential/axle housing assembly, or any other engine or drive line component of a vehicle. Furthermore, the apparatuses and methods of this invention may be used in any other application in which any oil or oil based liquid may leak.

Figure 9:
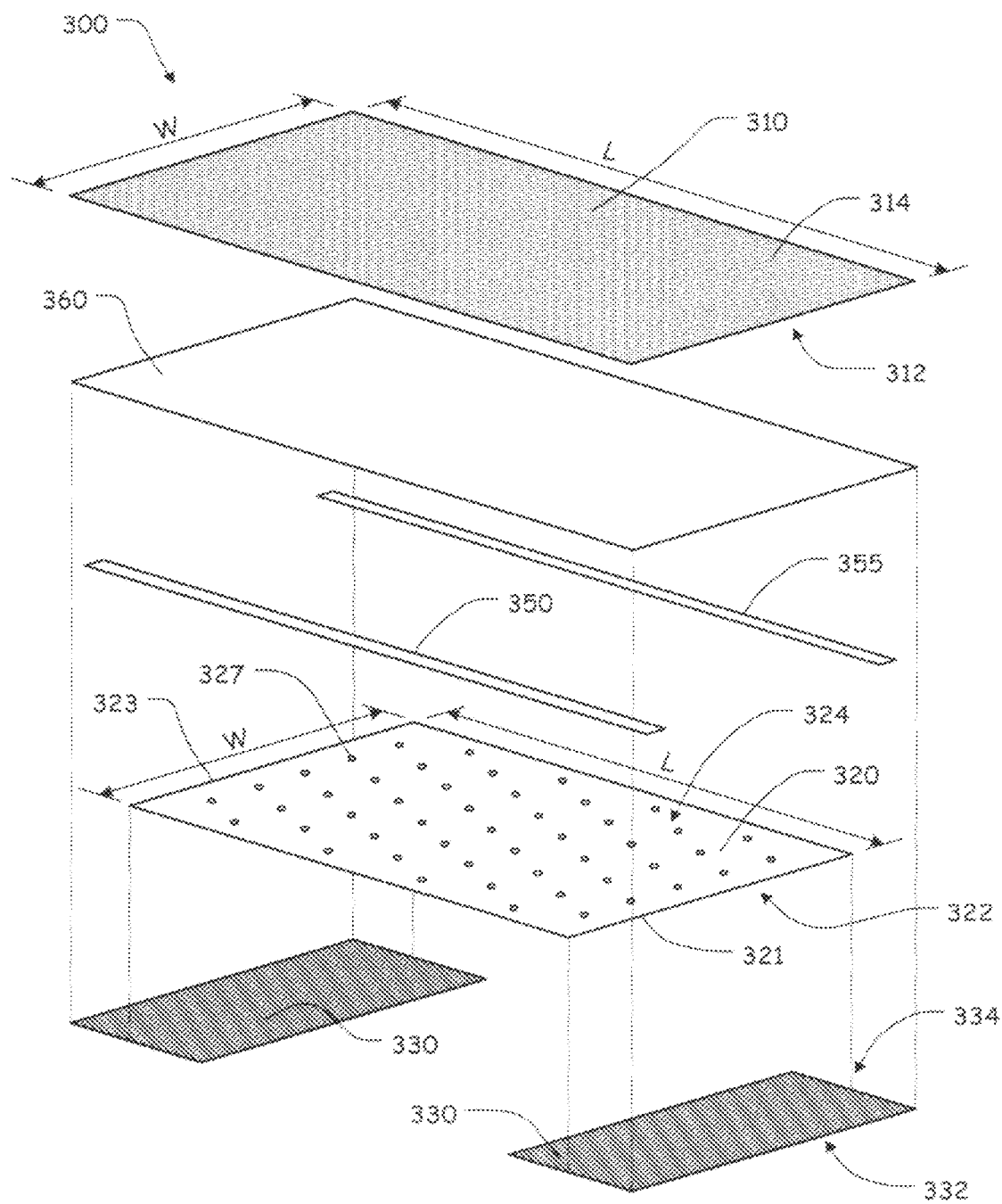
FIG. 9 shows a perspective view of certain of the constituent components of a third exemplary embodiment of a fluid arrestor, according to this invention.
Figure 10:
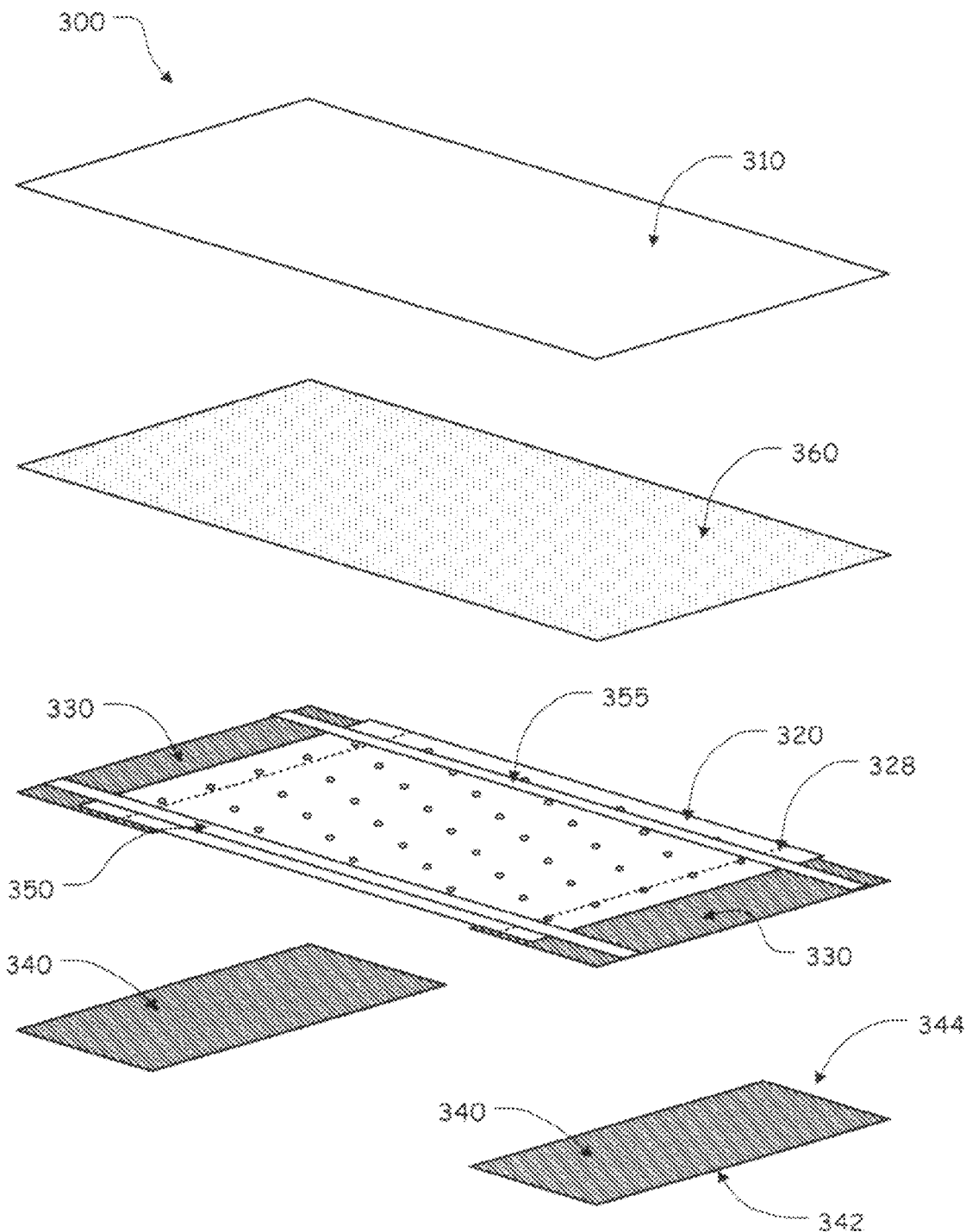
FIG. 10 shows a perspective view of certain of the constituent components of a third exemplary embodiment of a fluid arrestor, wherein certain of the components are assembled according to this invention.

FIG. 9 shows a perspective view of certain of the constituent components of a third exemplary embodiment of a fluid arrestor 300, while FIG. 10 shows a perspective view of certain of the constituent components of the fluid 300 arrestor, wherein certain of the components are assembled according to this invention. As shown in FIGS. 9 and 10, the fluid arrestor 300 includes at least some of a backing sheet 310, having a top side 312 and a bottom side 314, an absorption sheet 320, having a top side 322 and a bottom side 324, a first fastener means 330, having a top side 332 and a bottom side 334, and a second fastener means 340, having a top side 342, and a bottom side 344. If the absorption sheet 320 includes multiple layers of material, the layers may be at least partially attached or affixed to one another at various affixing points 327.

It should be appreciated that the elements listed above as being included in the fluid arrestor 300 correspond to and operate similarly to the corresponding backing sheet 110, having the top side 112 and the bottom side 114, the absorption sheet 120, having the top side 122 and the bottom side 124, the first fastener means 130, having the top side 132 and the bottom side 134, the second fastener means 140, having the top side 142, the bottom side 144, and the various affixing points 127, as discussed above with respect to the fluid arrestor 100. It should also be appreciated that the elements listed above as being included in the fluid arrestor 300 correspond to and operate similarly to the corresponding backing sheet 210, having the top side 212 and the bottom side 214, the absorption sheet 220, having the top side 222 and the bottom side 224, the first fastener means 230, having the top side 232 and the bottom side 234, the second fastener means 240, having the top side 242, the bottom side 244, and the various affixing points 227, as discussed above with respect to the fluid arrestor 200.

However, as shown in FIGS. 9 and 10, adhesive layer 360 attaches the bottom side 324 of the absorption sheet 322 to the top side 312 of the backing sheet 310. It should be appreciated that the particular adhesive used to form the adhesive layer 360 is a design choice based upon the desired bond between the backing sheet 310 and the absorption sheet 320. In various exemplary, nonlimiting embodiments, certain of the Potential Alternative Adhesives outlined in Table IV may be used to form the adhesive layer 360.

As illustrated in FIGS. 9 and 10, a width "W" of the backing sheet 310 is substantially similar to a width "W" of the absorption sheet 320, while a length "L" of the backing sheet 310 is substantially greater than a length "L" of the absorption sheet 320. In this manner, when the backing sheet 360 is attached, by the adhesive layer 360, to the absorption sheet 320, at least a portion of the backing sheet 310 (and the adhesive layer 360) extends beyond a front terminal edge 321 and a rear terminal edge 323 of the absorption sheet 320.

As further shown in FIGS. 9 and 10, the hook and loop attachment area of the first fastener means 330 is increased to improve the bonding force of the fluid arrestor 300 to the underside of an engine. Instead of utilizing, for example, four, 1" wide loop fastener strips attached to the oil absorption sheet interfacing with four, corresponding 1" square hook fastener patches attached to the underside of an engine, the fluid arrestor 300 of FIGS. 9 and 10 utilizes a loop fastener material that traverses the entire width of the fluid arrestor 300 on each end. Increased attachment area provides greater wind shear resistance and enhances the integrity of the fluid arrestor 300.

When the fluid arrestor 330 is assembled, the first fastener means 330 is attached, via stitching 328, to the absorption sheet 320. At least a portion of each of the first fastener means 330 extends beyond the front terminal edge 321 in the rear terminal edge 323 of the absorption sheet 320. The portion of each of the first fastener means 330 that extends beyond the absorption sheet 320 is attached, via the adhesive layer 360, to the top side 312 of the backing sheet 310.

As also illustrated in FIGS. 9 and 10, malleable strips 350 and 355 are included along the length of the fluid arrestor 300 so that the fluid arrestor 300 can be made to conform to irregular surfaces and sharp contours. In various exemplary embodiments, the malleable strips 350 and 355 are placed between the backing sheet and the absorption sheet. The strips run the full length of the fluid arrestor 300, are inserted ⅛ inch from the edges, and are held in place by a bonding agent applied to the strips prior to assembly. Once subject to the compression force exerted by pressure rollers during the manufacturing process, the malleable strip 350 and 355 become an integral component of the product. Increasing the adhesion and stability and limiting the wind shear component to which the oil absorption sheet is subjected make the malleable strip 350 and 355 a desirable addition to the fluid arrestor 300.

In various exemplary embodiments, the malleable strips 350 and 355 comprise one quarter inch wide by 0.010 inch thick 50/50 copper-tin strips.

In various exemplary embodiments, a window 318 is formed in the backing sheet 310 in an area of the backing sheet 310 that overlays one of the malleable strips 350 and/or 355. The window 318 allows a segment of at least one of the malleable strips 350 or 355 to be exposed to provide a space for a permanent stamp indicating batch and date of manufacture to be included in the fluid arrestor 300.

When installing the fluid arrestor 300, the fluid arrestor 300 can be at least partially molded to the contours of the structural components in the mounting vicinity.

Figure 11:
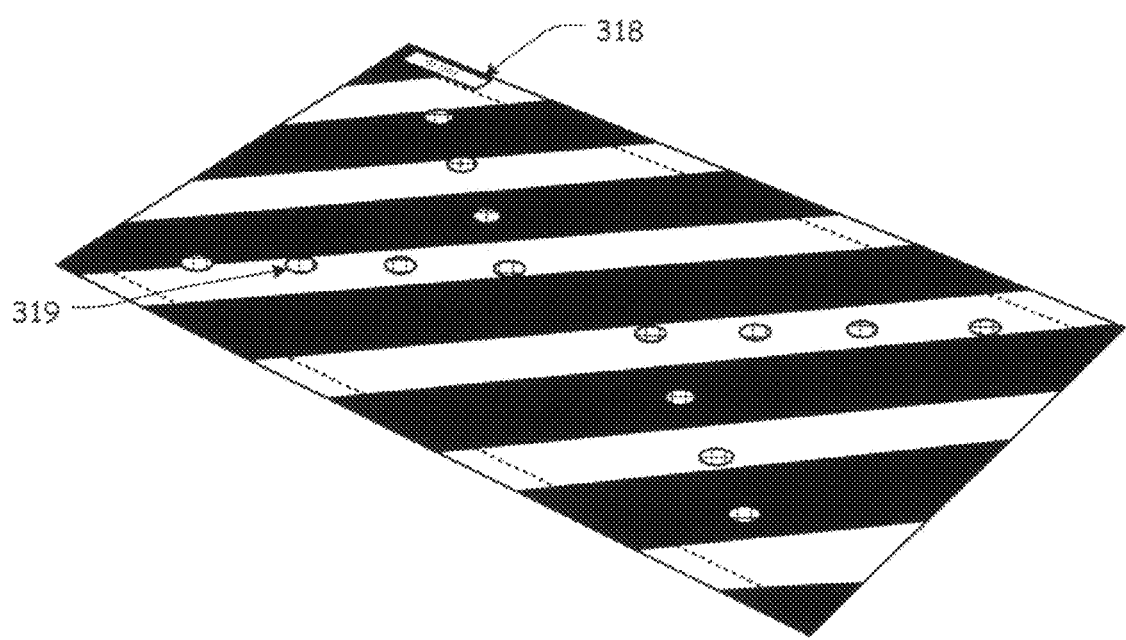
FIG. 11 shows a perspective view of the third exemplary embodiment of the fluid arrestor, highlighting the optional absorption indicators according to this invention.

FIG. 11 shows a perspective view of the third exemplary embodiment of the fluid arrestor 300, illustrating the optional absorption indicators 319 according to this invention. As shown in FIG. 11, the fluid arrestor 300 includes an array of holes or apertures (absorption indicators 319) formed in the backing sheet to provide a visual measure of the absorption sheet absorption level. When a dark hue can be seen through all of the viewing apertures, absorption sheet saturation has occurred and the fluid arrestor 300 must be renewed.

Whereas this is not an exact science, it does provide the user with a visual indicator when the fluid arrestor 300 should be replaced.

In various exemplary embodiments, fourteen ¼ inch diameter viewing apertures, or absorption indicators 319, are formed in the backing sheet to allow a visual indicator of absorption sheet saturation. Since the used motor oil spreads from the point of contact to the entire sheet, these viewing apertures, configured in a "V" pattern with opposing vertices pointing toward each other, provide the visual means necessary to determine the level of sheet saturation. When all of the absorption indicators 319 are dark brown, the color of used motor oil, it can be assumed that the fluid is at or near maximum containment. This information coupled with the date the fluid arrestor 300 was installed and the corresponding vehicle odometer reading supplies the information needed to compile data that will give an estimate of the amount and rate at which motor oil is reaching the environment.

In certain exemplary embodiments, the backing sheet is constructed of a material that changes color, as it is exposed to an oil, indicating that absorption capacity is approached, and that it is time for replacement of the fluid arrestor 300. Alternatively, a specifically colored text, image, or other icon can be included on the backing sheet such that when the text changes color, for example, from yellow to black, it is indicated that it is time for replacement of the fluid arrestor 300.

Figure 12:
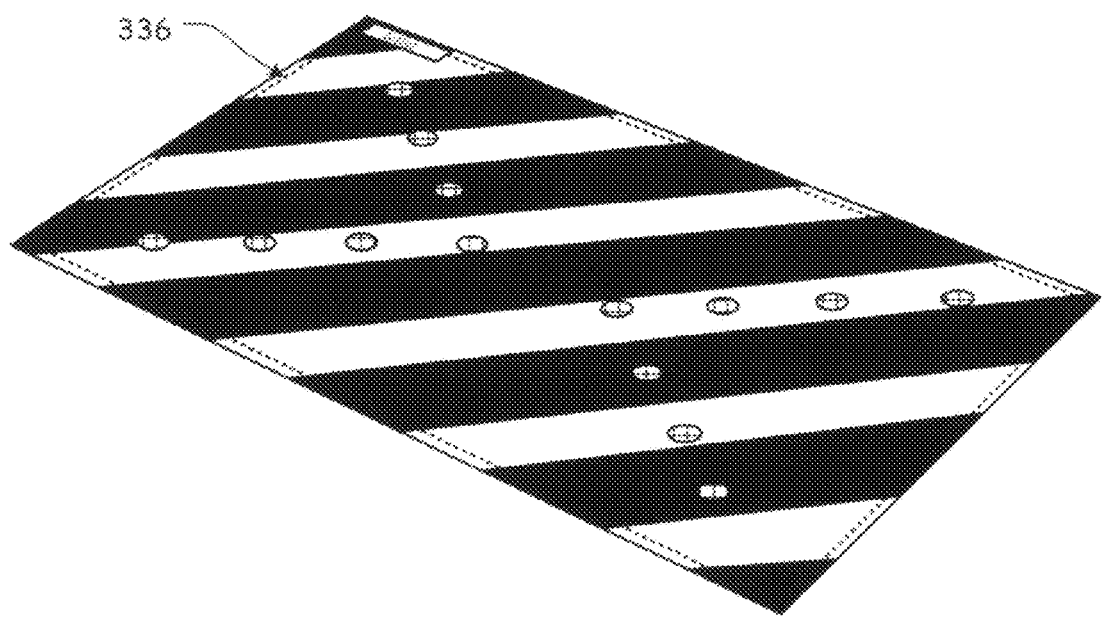
FIG. 12 shows a perspective view of the third exemplary embodiment of the fluid arrestor, highlighting the optional heat sealed edges according to this invention.

FIG. 12 shows a perspective view of the third exemplary embodiment of the fluid arrestor 300, highlighting the optional heat sealed edges 336 according to this invention. As shown in FIG. 12, in order to prevent delamination of the backing sheet from the absorption sheet, the backing sheet is heat sealed to at least the leading and trailing edges of the absorption sheet. Alternatively, the backing sheet is heat sealed to the absorption sheet around the entire periphery of the absorption sheet.

Heat sealing the edges essentially eliminates the possibility of delamination. During the manufacturing process, heated rollers traverse both ends of the absorption sheet and fuse the nylon loop fastener strips to the backing sheet. This process joins the two materials by melting them together. Heated rollers run perpendicularly to the end rollers and fuse the melt-blown polypropylene oil absorption sheet to the backing sheet just prior to the shearing process. The end product is thus heat sealed on all edges and the integrity of the product is greatly enhanced.

When properly applied, an impulse heat seal, for example, provides an appropriate amount of heat to bond the backing sheet to the absorption sheet without deforming either substrate. Since the leading and trailing edges of the absorption sheet are mated with loop fastener material, the actual bond exists between the back side and the loop fastener material and the backing sheet. Heat sealing the backing sheet to the absorption sheet is superior to the use of a transfer adhesive alone in that the transfer adhesive can result in inconsistent bonds between the edges of the two materials. While a transfer adhesive can be used to provide indexing of the two materials to be heat-sealed, heat-sealing at least the leading and trailing edges of the fluid arrestor 300 backing sheet to the absorption sheet increases the performance, integrity, and quality of the fluid arrestor 300.

Figure 13:
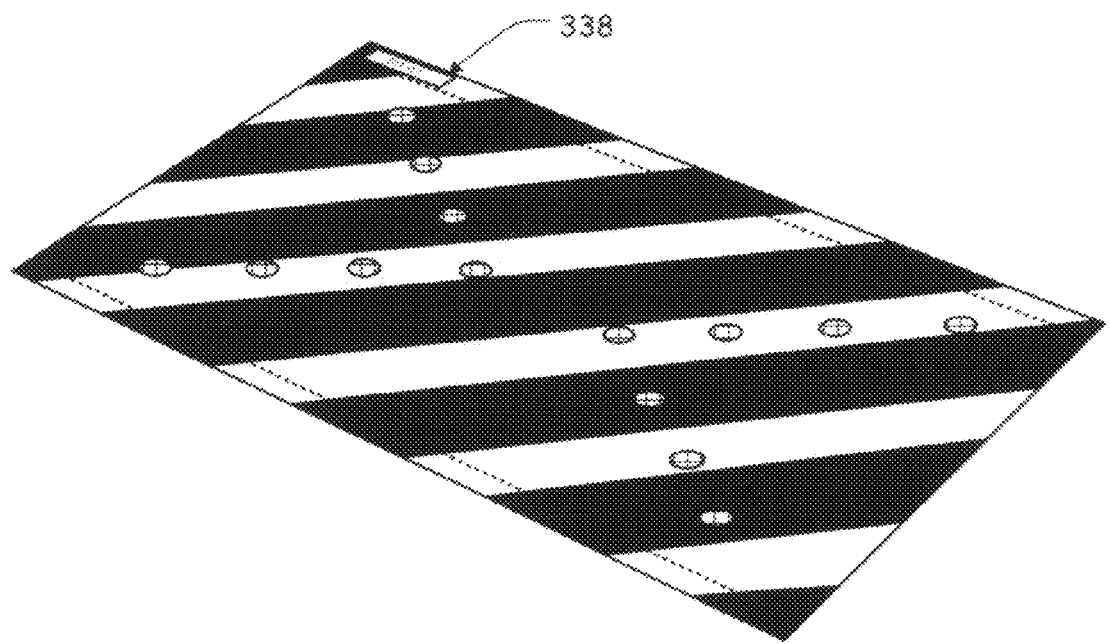
FIG. 13 shows a perspective view of the third exemplary embodiment of the fluid arrestor, highlighting the optional date/batch stamp indicator according to this invention.

FIG. 13 shows a perspective view of the third exemplary embodiment of the fluid arrestor 300, highlighting the optional date/batch stamp indicator 338 according to this invention. As shown in FIG. 13, a date stamp area is provided proximate a corner of the backing sheet. The date stamp area can be created by masking the date stamp area with removable film or programming the print routine used to print a graphic on the backing sheet to leave the date stamp area non-printed during the manufacturing process. The date stamp area can be used for marking the fluid arrestor 300 with a date of manufacture or an installation date. By keeping track of the date of manufacture, a baseline can be provided that links the product to its design specifications and processes used during manufacturing. By keeping track of the installation date, information regarding volumetric oil leak analysis can be performed. If information regarding the date of installation and vehicle odometer reading is maintained, the actual amount of oil leaking from an engine or other device, over specific period of time, can be calculated or approximated.

In various exemplary embodiments, the date stamp area comprises a ⅜" by ½" clear rectangular area in a corner of the backing sheet that provides a designated area for date stamping the fluid arrestor 300. However, it should be appreciated that the date stamp area can be formed of any desired size in any desired area of the fluid arrestor 300.

While this invention has been described in conjunction with the exemplary embodiments outlined above, it is evident that many alternatives, modifications, and variations will be apparent to those skilled in the art. For example, the overall size, shape, constituent components, and placement of the fluid arrestor may vary for each specific application. Accordingly, the foregoing description of the these exemplary embodiments will reveal the general nature of the invention, such that others may, by applying current knowledge, readily modify and/or adapt for various applications these exemplary embodiments without departing from the spirit and scope of the invention. Therefore, such adaptations and modifications should and are intended to be comprehended within the meaning and range of equivalents of the disclosed exemplary embodiments. It is to be understood that the phraseology of terminology employed herein is for the purpose of description and not of limitation.

What is claimed is:

1. An article for absorbing fluids, comprising:
    a backing sheet having a top side and a bottom side, wherein said backing sheet is oil and water resistant;
    an absorption sheet having a top side and a bottom side, wherein said absorption sheet is made of a material that is capable of absorbing an oil based liquid, and wherein said backing sheet is attached to said absorption sheet;
    at least one absorption indicator, wherein said at least one absorption indicator comprises an aperture formed in said backing sheet such that a portion of said absorption sheet can be viewed through said at least one absorption indicator; and
    at least one first fastener means having a top side and a bottom side, wherein said first fastener means includes an attachment means on said bottom side and a mating attachment means on said top side, wherein said bottom side of said first fastener means is at least partly attached to said top side of said absorption sheet, and wherein at least a portion of said bottom side of said first fastener means is attached to said top side of said backing sheet.

2. The article of claim 1, wherein one or more malleable strips are positioned along at least a portion of a length of said article.

3. The article of claim 1, wherein said malleable strips are placed between the backing sheet and the absorption sheet.

4. The article of claim 1, wherein said backing sheet is comprised of a material that is selected from the group consisting of plastic, metal foil, acrylic, polymer, and vinyl.

5. The article of claim 1, wherein said absorption sheet is made of a material that is water repellant.

6. The article of claim 1, wherein said absorption sheet is made of a material that is heat resistant.

7. The article of claim 1, wherein said absorption sheet is made of a material that is capable of absorbing any oil based liquid and repelling water.

8. The article of claim 1, wherein said attachment means on said bottom side of said first fastener means is at least partly attached to said top side of said absorption sheet and is at least partly attached to said top side of said backing sheet.

9. The article of claim 1, wherein said backing sheet is constructed of a material that changes color as it is exposed to an oil.

10. The article of claim 1, wherein said attachment means on said bottom side of said first fastener means includes an adhesive.

11. The article of claim 1, wherein said mating attachment means on said top side of said first fastener means is selected from the group consisting of hook and loop fasteners, male/female snap-release buckles, buttons, and snaps.

12. The article of claim 1, further comprising at least one second fastener means having a top side and a bottom side, wherein said second fastener means is capable of matedly connecting with said first fastener means, and wherein said second fastener means includes an attachment means on said top side and a mating attachment means on said bottom side.

13. The article of claim 12, wherein said attachment means on said top side of said second fastener means includes an adhesive.

14. The article of claim 12, wherein said mating attachment means on said bottom side of said second fastener means is selected from the group consisting of hook and loop fasteners, male/female snap-release buckles, buttons, and snaps.

15. The article of claim 12, wherein said first fastener means and said second fastener means may be matedly attached to each other, via said mating attachment means, and wherein said first fastener means and said second fastener means may be adhesively attached to another surface.

16. An article for arresting fluids, comprising:
    a backing sheet having a top side and a bottom side, wherein said backing sheet is water resistant and oil resistant, and wherein said backing sheet is made of a non-porous material;
    a heat resistant absorption sheet having a top side and a bottom side, wherein said absorption sheet is made of a material that is capable of absorbing any oil based liquid and repelling water, and wherein said backing sheet is at least partly attached to said absorption sheet;
    at least one first fastener means having a top side and a bottom side, wherein said first fastener means includes a mating attachment means on said top side, wherein a first portion of said bottom side of said first fastener means is at least partly attached to said absorption sheet, and wherein a second portion of said bottom side of said first fastener means is attached to said top side of said backing sheet;
    one or more malleable strips positioned along at least a portion of a length of said article; and
    one or more absorption indicators, wherein each absorption indicator includes an aperture formed in said backing sheet such that a portion of said absorption sheet can be viewed through said one or more absorption indicators.

17. The article of claim 16, wherein said absorption sheet comprises melt blown polypropylene.

18. The article of claim 16, wherein said backing sheet is at least partly attached to said absorption sheet via one of heat sealing, heat die stamping, one or more folded edges, staples, buttons, adhesive affixing points, rivets, snaps, sewn areas, pressure seals, clamps, ultrasonic bonds, and grommets.

19. The article of claim 16, further comprising at least one second fastener means having a top side and a bottom side, wherein said second fastener means is capable of matedly connecting with said first fastener means, and wherein said second fastener means includes an adhesive attachment means on said top side and a mating attachment means on said bottom side.

* * * * *